United States Patent

[11] 3,620,907

| [72] | Inventor | Edward L. Yuan |
| | | Philadelphia, Pa. |
| [21] | Appl. No. | 873,123 |
| [22] | Filed | Oct. 31, 1969 |
| [45] | Patented | Nov. 16, 1971 |
| [73] | Assignee | E. I. du Pont de Nemours and Company |
| | | Wilmington, Del. |

[54] LAMINATE WITH LAYERS OF POLYIMIDE AND POLYAMIDE
8 Claims, No Drawings

[52] U.S. Cl. .................................................... 161/227, 260/78
[51] Int. Cl. ........................................................ B32b 27/06
[50] Field of Search ............................................ 161/227; 117/118; 260/78

[56] References Cited
UNITED STATES PATENTS

| 3,361,589 | 1/1968 | Lindsey .......................... | 161/227 |
| 3,442,703 | 5/1969 | Naselow ......................... | 117/218 |
| 3,505,168 | 4/1970 | Dunphy et al. ................. | 161/227 |

*Primary Examiner*—Douglas J. Drummond
*Attorney*—John E. Griffiths

ABSTRACT: A laminate useful for electrical insulation comprising layers of:
A. a fibrous aromatic polyamide thermally stable at 180° C.; and
B. a polyimide; and
C. situated between layers A. and B., a precursor of a polyimide, said precursor having been sufficiently converted into a polyimide to cause layers A. and B. to be adhesively secured to each other.

LAMINATE WITH LAYERS OF POLYIMIDE AND POLYAMIDE

BACKGROUND OF THE INVENTION

The need exists for electrical sheet insulation having good tear strength, tensile strength, dimensional stability, layer-to-layer adhesion, electrical properties, temperature resistance, etc.

The products of this invention provide an excellent combination of the foregoing and other desired properties.

SUMMARY OF THE INVENTION

According to the present invention there is provided a laminate comprising layers of:

A. a fibrous aromatic polyamide thermally stable at 180° C.; and

B. a polyimide; and

C. situated between layers A. and B., a precursor of a polyimide, said precursor having been sufficiently converted into a polyimide to cause layers A. and B. to be adhesively secured to each other.

The thermally stable fibrous aromatic polyamide layer is a known material. It includes (1) a paperlike sheet structure made from polyamide fibrids which incorporates, if desired, polyamide fibers as described in Morgan U.S. Pat. No. 2,999,788 issued Sept. 12, 1961, the disclosure of which is hereby incorporated by reference; (2) a nonwoven web of polyamide fibers; and (3) a woven fabric of polyamide fibers.

If desired, to produce a laminate having certain desirable electrical properties in addition to those already mentioned, there may be incorporated in the aforementioned fibrous polyamide layer, 10 to 90, preferably 25-75 weight percent particulate mica.

The mica particles may be obtained by any of the methods known to the art. Thus, they may be obtained from muscovite, phlogophite or other micaceous bodies by chemical or mechanical exfoliation processes or by dry or wet grinding. Descriptions of three exfoliation processes are given by Milford L. Skow, U. S. Bureau of Mines Information Circular No. 8125 (1962) pp. 78–82.

Selection of a particular type of mica and the amount thereof for use in a particular structure will depend on the electrical properties desired, and, also, on the manner in which the resultant paper is to be compacted. If arc and track resistance are of primary importance, all types of particulate mica exhibit effectiveness over the entire content range of 10 to 90 percent.

If dielectric strength is of primary importance, it should be noted that dielectric strength decreases with increasing mica content. This phenomenon is observed with all types of mica and compaction processes. However, the type of mica and compaction process employed markedly affect the magnitude of this decrease. For example, with exfoliated platelet mica or with powdered mica (i.e., mica having at least 30 percent by weight of less than 10 microns particle planar size), up to about 20 percent of such mica may be used without loss of dielectric strength. Dielectric strength decreases moderately with greater amounts of such mica. With exfoliated platelet mica and powdered mica, dielectric strength is not markedly affected by the type of compaction. However, with wet- and dry-ground micas, dielectric strength decreases with larger particle sizes much more so when the resultant web is roll pressed than when platen pressed.

The term "particle planar size" refers to the width of the platelet. Platelet width is commonly determined by using a series of sieves, such as, for example, 4 sieves having openings of 37, 44, 74 and 149 microns. When using these 4 sieves to characterize a sample of mica, the particle planar size will be recorded as greater than 149, 74–149, 44–74, 37–44 and less than 37.

Several factors should be considered where voltage endurance is important. For example, voltage endurance increases with increasing degree of exfoliation. Generally, the degree of exfoliation of mica, and, correspondingly the degree of voltage endurance, is in the descending order of (a) chemically exfoliated mica, (b) mechanically exfoliated mica, (c) wet-ground mica, and (d.) dry-ground mica. Particle planar size (i.e., the maximum width of a mica platelet) affects voltage endurance. Voltage endurance generally increases with decreasing particle size to some degree to below 37 microns. However, very-fine-particle-size micas do not enhance voltage endurance. The optimum planar size range insofar as voltage endurance is concerned is on the order of 10 to 37 microns. The loss of effectiveness is greater below 10 microns than it is above 37 microns. The amount of mica used also affects voltage endurance, with voltage endurance increasing with increasing mica content.

Preferred polyamide materials include (1) a thermally stable fibrous aromatic polyamide paperlike sheet structure made from polyamide fibrids which incorporates, if desired, polyamide fibers as described in the above mentioned Morgan patent and (2) the sheet structure above described in (1) containing 25–75 weight percent particulate mica.

Polyimide is a known material. It includes materials described in Edwards U.S. Pat. No. 3,179,634 issued Apr. 20, 1965, the disclosure of which is hereby incorporated by reference. Preferred polyimides include the reaction product of pyromellitic dianhydride and oxidianiline.

Precursors of polyimides are known. The earliest and best known of the precursors are polyamide-acids of the class defined in Edwards U.S. Pat. No. 3,179,614 issued Apr. 20, 1965. Species of such polyamide-acids are described in Lavin, Markhart and Kass U.S. Pat. No. 3,190,856 issued June 22, 1965. Other species are described in Frost and Bower U.S. Pat. No. 3,179,635 issued Apr. 20, 1965, and Loncrini U.S. Pat. No. 3,182,073 issued May 4, 1965.

Another class of precursors are polyamide-esters. An example of this class is described in Sorenson U.S. Pat. No. 3,312,663 issued Apr. 4, 1967.

Another class of precursors are polyamide-amic acids of the type described in Lavin, Markhart and Santer, U.S. Pat. No. 3,260,691 issued July 12, 1966.

Still another class of precursors are described in Lavin, Markhart and Kass, U.S. Pat. No. 3,347,808, issued Oct. 17, 1967. As is known in the art, such precursors include compositions of alkyl diester derivatives of benzophenone tetracarboxylic acid and diamines in an organic solvent.

The disclosure of each of the above references is hereby incorporated in its entirety.

Preferred precursors include the use of a polyamide that is the polymeric condensation product of:

A. (1) an aromatic primary diamine containing from six 6 to 16 carbon atoms (such as, for example, methylene dianiline or oxidianiline) and (2) the dianhydride of an acid selected from the group consisting of 2,2',3,3'-,2,3,3,4'-, 3,3'4,4'-benzophenone tetracarboxylic acids and mixtures thereof; or B. (2) a suitable aromatic primary diamine such as, for example, oxidianiline and (2) a suitable dianhydride, such as for example bis(3,4-dicarboxyphenyl) sulfone dianhydride.

The thickness of the layers will be determined by the particular end use contemplated. For most purposes, the thickness of the fibrous polyamide is in the range of 1 to 20 mils and preferably 2 to 10 mils thick. The thickness of the polyimide layer is in the range of 0.1 to 10 mils and preferably 0.5 to 3 mils thick. Ordinarily, the thickness of the precursor layer, when sufficiently converted to a polyimide to cause adhesion of the layers of polyamide and polyimide, will be in the range of 0.1 to 2 mils and preferably 0.25 to 1 mil thick. In view of the thickness of the foregoing layers, the laminate can have a total thickness of about up to 32 mils.

The laminate of this invention can be prepared by known techniques. That is, for example, the precursor can be coated on one side of a sheet of fibrous aromatic polyamide. The coated side of the sheet is then placed in contact with a polyimide in sheet form and subjected to sufficient heat, pressure or other suitable means to form the desired laminate.

Another suitable lamination technique is to coat one side of a polyimide in sheet form with a precursor. The coated side of the sheet is then placed in contact with a sheet of fibrous polyamide and subjected to sufficient heat, pressure or other suitable means to form the desired laminate.

Still another lamination method is to coat one side of the sheet of polyamide and one side of the sheet of polyimide with a precursor. The coated sides of these sheets are then placed in contact with each other and subjected to sufficient heat, pressure or other suitable means to form the desired laminate.

As is known in the art, precursors of polyimides may be in the form of a solution in a suitable solvent. If this type of solvent-precursor system is used and if heat and if desired pressure is used to form the laminate, to obtain suitable adhesion between the layers, it may be desirable to retain about 1–10 percent by weight (based on the weight of the precursor after it has been sufficiently converted to a polyimide to cause the polyamide sheet and the polyimide sheet to be adhesively secured to each other) of the solvent.

In certain situations to obtain better adhesion between the polyamide sheet and the polyimide sheet, it may be desirable to admix with the precursor before lamination, about 0.1 to 1 percent by weight, based on weight of the precursor, of a silane adhesion promotor. Suitable silanes include gamma-glycidoxypropyltrimethoxysilane and gamma-aminopropyltriethoxysilane.

EXAMPLE 1

A polyimide sheet, having a thickness of about 1 mil, was prepared from the reaction product of pyromellitic dianhydride and oxydianiline. This sheet was then coated on one side with a polyamide-acid precursor which was the reaction product of benzophenonetetracarboxylic acid dianhydride and methylene dianiline. Following the above, the coated side of the sheet was (1) placed in contact with a 5 mil polyamide sheet structure formed according to the above identified Morgan patent, which had been impregnated with the same above-mentioned precursor, and (2) subjected simultaneously to 5,000 pounds per square inch of pressure and 200° C. for one minute to produce a laminate.

The resulting product was found to have excellent electrical properties.

EXAMPLE 2

Using the procedure of example 1, a sheet of the coated polyimide described in example 1 was laminated to a 5 mil polyamide sheet formed according to the procedure of the above-identified Morgan patent which contained 50 percent by weight of mica particles.

The resulting product was found to have excellent electrical properties.

EXAMPLE 3

Using the procedure of example 1, a sheet of the coated polyimide described in example 1 was laminated to a 5 mil polyamide sheet comprised of a nonwoven web of polyamide fibers.

The resulting product was found to have excellent electrical properties.

EXAMPLE 4

Examples 1–3 can be repeated using a polyamide-acid precursor which is the reaction product of benzophenone tetracarboxylic acid dianhydride and oxidianiline to produce a product having desirable electrical properties.

EXAMPLE 5

Examples 1–3 can be repeated using a polyamide-acid precursor which is the reaction product of bis(3,4-dicarboxyphenyl) sulfone dianhydride and oxidianiline.

The invention claimed is:

1. A laminate comprising layers of:
   A. a fibrous aromatic polyamide thermally stable at 180° C.; and
   B. a polyimide, and
   C. situated between layers A. and B., a precursor of a polyimide, said precursor having been sufficiently converted into a polyimide to cause layers A. and B. to be adhesively secured to each other.

2. The laminate of claim 1 wherein the fibrous aromatic polyamide described in A. contains 10–90 percent by weight of particulate mica.

3. The laminate of claim 1 wherein the precursor of a polyimide described in C. is a soluble, flexible polyamide that is the polymeric condensation product of an aromatic primary diamine containing from 6 to 16 carbon atoms with the dianhydride of an acid selected from the group consisting of 2,2',3,3'–,2,3,3'4'–,3,3',4,4'-benzophenone tetracarboxylic acids and mixtures thereof.

4. The laminate of claim 1 wherein the precursor of a polyimide described in C. is a solid, flexible polyamide that is the polymeric condensation product of oxydianiline and bis(3,4-dicarboxyphenyl) sulfone dianhydride.

5. The laminate of claim 1 wherein layer A. is 1 to 20 mils thick.

6. The laminate of claim 1 wherein layer B. is 1 to 10 mils thick.

7. The laminate of claim 1 wherein layer C. is 0.1 to 2 mils thick.

8. The laminate of claim 1 wherein the total thickness is up to 32 mils.

* * * * *